(12) United States Patent
Li et al.

(10) Patent No.: US 12,541,350 B2
(45) Date of Patent: Feb. 3, 2026

(54) METHOD AND DEVICE FOR PARSING PROGRAMMING LANGUAGE, AND NON-TRANSITORY COMPUTER-READABLE STORAGE MEDIUM

(71) Applicants: PEKING UNIVERSITY, Beijing (CN); PEKING UNIVERSITY CHONGQING RESEARCH INSTITUTE OF BIG DATA, Chongqing (CN)

(72) Inventors: Ruo Li, Beijing (CN); Tiao Lu, Beijing (CN)

(73) Assignees: PEKING UNIVERSITY, Beijing (CN); PEKING UNIVERSITY CHONGQING RESEARCH INSTITUTE OF BIG DATA, Chongqing (CN)

( * ) Notice: Subject to any disclaimer, the term of this patent is extended or adjusted under 35 U.S.C. 154(b) by 0 days.

(21) Appl. No.: 18/252,232

(22) PCT Filed: Sep. 15, 2022

(86) PCT No.: PCT/CN2022/119100
§ 371 (c)(1),
(2) Date: May 9, 2023

(87) PCT Pub. No.: WO2023/138078
PCT Pub. Date: Jul. 27, 2023

(65) Prior Publication Data
US 2025/0199779 A1     Jun. 19, 2025

(30) Foreign Application Priority Data
Jan. 20, 2022 (CN) .......................... 202210063667.0

(51) Int. Cl.
G06F 9/44      (2018.01)
G06F 8/30      (2018.01)
G06F 8/41      (2018.01)

(52) U.S. Cl.
CPC ................ *G06F 8/425* (2013.01); *G06F 8/31* (2013.01); *G06F 8/427* (2013.01)

(58) Field of Classification Search
CPC ............ G06F 8/425; G06F 8/31; G06F 8/427
See application file for complete search history.

(56) References Cited

U.S. PATENT DOCUMENTS 8,943,472 B1    1/2015  Ganelin
11,061,652 B1 *  7/2021  Biswas .................. G06F 8/427
(Continued)

FOREIGN PATENT DOCUMENTS

CN    106033394 A    10/2016
CN    110221836 A     9/2019
(Continued)

OTHER PUBLICATIONS

Begel, et al., "Language Analysis and Tools for Ambiguous Input Streams", Electronic Notes in Theoretical Computer Science 110 (2004) 75-96.
(Continued)

*Primary Examiner* — Qamrun Nahar
(74) *Attorney, Agent, or Firm* — Riverside Law LLP

(57) ABSTRACT

The embodiments of the disclosure disclose a method and device for parsing a programming language, and a non-transitory computer-readable storage medium. The method includes that: a source code is converted as a character stream, and the character stream is parsed into a lexical unit list, the lexical unit list including a plurality of lexical units; the plurality of lexical units are classified into a first-type lexical unit and a second-type lexical unit, the first-type
(Continued)

lexical unit being a lexical unit including an ambiguous token, and the second-type lexical unit being a lexical unit not including the ambiguous token; the first-type lexical unit is converted into the second-type lexical unit; and the second-type lexical unit converted from the first-type lexical unit and the second-type lexical unit classified from the plurality of lexical units are parsed.

8 Claims, 5 Drawing Sheets

(56) References Cited

U.S. PATENT DOCUMENTS

| | | |
|---|---|---|
| 2010/0088674 A1 | 4/2010 | Della-Libera |
| 2013/0055223 A1* | 2/2013 | Xu .............................. G06F 8/42 717/143 |
| 2017/0024193 A1 | 1/2017 | Goubier |
| 2017/0242842 A1* | 8/2017 | Halbani ................ G06F 40/284 |
| 2018/0081870 A1* | 3/2018 | Zelenkov ................ G06F 40/45 |
| 2020/0097389 A1* | 3/2020 | Smith ................ G06F 11/3636 |

FOREIGN PATENT DOCUMENTS

| | | |
|---|---|---|
| CN | 110673854 A | 1/2020 |
| CN | 111309757 A | 6/2020 |
| CN | 113741869 A | 12/2021 |
| CN | 114090017 A | 2/2022 |
| JP | H05241850 A | 9/1993 |
| WO | 2015006075 A1 | 1/2015 |

OTHER PUBLICATIONS

Joisha, et al., "Handling Context-Sensitive Syntactic Issues in the Design of a Front-end for a MATLAB Compiler", Supplement to the APL Berlin 2000 Proceedings, Jul. 24, 2000.

Malloy, et al, "Decorating tokens to facilitate recognition of ambiguous language constructs", Softw. Pract. Exper. 2003; 33:19-39 (Nov. 12, 2002).

Q. Pan, et al.: "Design and optimization of SCPI command interpreter based on Python," Industrial Control Computer 33 (2020) 75. The first office action of counterpart JP application No. 2024-540883 was issued on May 20, 2025.

\* cited by examiner

METHOD AND DEVICE FOR PARSING PROGRAMMING LANGUAGE, AND NON-TRANSITORY COMPUTER-READABLE STORAGE MEDIUM

CROSS-REFERENCE TO RELATED APPLICATIONS

This application is a U.S. national phase application filed under 35 U.S.C. § 371 claiming benefit to International Patent Application No. PCT/CN2022/119100, filed Sep. 15, 2022, which claims priority to Chinese Patent Application no. 202210063667.0, filed Jan. 20, 2022, each of which applications is hereby incorporated herein by reference in its entirety.

TECHNICAL FIELD

The embodiments of the disclosure relate to the field of software, and in particular to a method and device for parsing a programming language, and a non-transitory computer-readable storage medium.

BACKGROUND

FIG. 1 is a schematic diagram of a compilation running process of a current high-level programming language. As shown in FIG. 1, the compilation running process of the high-level language involves three forms: a) a compiled language (such as C language), where a source code is generated by a compiler into a binary executable program, which is directly executed by a machine; b) a first interpreted language (such as Java language), where the source code is converted into an intermediate code (such as byte code) by an interpreter and interpreted and executed in a virtual machine; and c) a second interpreted language (such as Lisp language), where the source code is directly interpreted and executed by the interpreter.

The compiler is a program that translates a source language program (usually the high-level language) into a target language (usually a machine language represented by a binary number). FIG. 2 is a running flowchart of the compiler. As shown in FIG. 2, the whole compilation process shown in FIG. 2 may be roughly divided into six stages: lexical analysis, syntax analysis, semantic analysis, intermediate code generation, code optimization and target code production.

FIG. 3 is a running flowchart of the interpreter. As shown in FIG. 3, the interpreter is a program that interprets and executes the source code. The whole interpretation process may be roughly divided into four stages, including: lexical analysis, syntax analysis, semantic analysis, intermediate code generation or direct interpretation execution.

1) A lexical analyzer, which scans a character stream that constitutes a source program, that is, reads the source program character by character from left to right, then identifies a word (also called a word token or token) according to a word formation rule and reorganizes same into a lexical unit list.

2) A syntax analyzer, which uses a first component of each lexical unit obtained by lexical analysis to create a syntax tree. Herein, each internal node in the tree represents an operation, and a child node of the node represents a component of the operation. The syntax analysis is a logical stage to judge whether the source program is structurally correct or not.

3) A semantic analyzer, which uses information in the syntax tree and token table to check whether the source program is consistent with the semantics of language definition. Meanwhile, type information is collected and an abstract syntax tree is generated. Semantic analysis is a logical stage to examine the context-related nature of the structurally correct source program, mainly type checking.

The existing interpreter is sufficient to cope with a general programming language, such as the Lisp language, but is insufficient to cope with a numerical computing programming language. The numerical computing language may introduce more mathematical tokens, which will lead to ambiguity of some tokens, that is, an ambiguous code in the source code. For example, the single quotation mark ' in the source code can not only indicate the beginning or end of a character, but also indicate the transposition of a matrix. When the single quotation mark indicates the beginning or end of the character, the type thereof is a delimiter. When the single quotation mark indicates the transposition of the matrix, the type thereof is an operational character. When single quotation marks are different types, the syntax tree produced is essentially different from the abstract syntax tree. On the basis of the existing interpreter architecture, the interpreter may only treat the single quotation mark as a fixed type, which will lead to a wrong result.

The introduction of mathematical token into the numerical computing programming language is ambiguity, which can lead to errors when the interpreter processes the numerical computing programming language, no effective solution has been put forward at present for this problem.

SUMMARY

According to an aspect of the embodiments of the disclosure, a method for parsing a programming language is provided, including that: a source code is converted as a character stream, and the character stream is parsed into a lexical unit list, the lexical unit list including a plurality of lexical units; the plurality of lexical units are classified into a first-type lexical unit and a second-type lexical unit, the first-type lexical unit being a lexical unit including an ambiguous token, and the second-type lexical unit being a lexical unit not including the ambiguous token; the first-type lexical unit is converted into the second-type lexical unit; and the second-type lexical unit converted from the first-type lexical unit and the second-type lexical unit classified from the plurality of lexical units are parsed.

Alternatively, the operation of classifying the plurality of lexical units into the first-type lexical unit and the second-type lexical unit may include that: token-names of the plurality of lexical units are acquired; an ambiguous target token-name is determined from the token-names; and the lexical unit to which the target token-name belongs is determined as the first-type lexical unit, and the lexical unit to which the token-names except the target token-name belong is determined as the second-type lexical unit.

Alternatively, the operation of converting the first-type lexical unit into the second-type lexical unit may include that: the first-type lexical unit is input to a semantic analyzer for parsing to obtain the second-type lexical unit. The operation of parsing the second-type lexical unit converted from the first-type lexical unit and the second-type lexical unit classified from the plurality of lexical units may include that: the second-type lexical unit converted from the first-type lexical unit and the second-type lexical unit classified from the plurality of lexical units are input to a syntactic analyzer for parsing; and a parsing result of the second-type lexical unit by the syntactic analyzer is input to the semantic analyzer for parsing.

Alternatively, the operation of inputting the first-type lexical unit into the semantic analyzer for parsing to obtain the second-type lexical unit may include that: the type of the token-name of the first-type lexical unit is determined according to context information of the first-type lexical unit; and an attribute-value of the first-type lexical unit is modified according to the type of the token-name of the first-type lexical unit to obtain the second-type lexical unit.

Alternatively, the operation of inputting the second-type lexical unit converted from the first-type lexical unit and the second-type lexical unit classified from the plurality of lexical units into the syntactic analyzer for parsing may include that: the second-type lexical unit converted from the first-type lexical unit and the second-type lexical unit classified from the plurality of lexical units are assembled into a syntax analysis tree.

Alternatively, the operation of inputting the parsing result of the second-type lexical unit by the syntactic analyzer into the semantic analyzer for parsing may include that: simplifying processing is performed on the syntax analysis tree to construct an abstract syntax tree.

Alternatively, the operation of parsing the character stream into the lexical unit list may include that: the character stream is parsed into the lexical unit list according to a preset word formation rule. Herein, each lexical unit in the lexical unit list includes: the token-name and the attribute-value. The token-name is the lexical unit itself, and the attribute-value is the type of the lexical unit.

According to another aspect of the embodiments of the disclosure, a device for parsing a programming language is also provided. The device including: (1) a first parsing component, which is configured to identify a source code as a character stream, and parse the character stream into a lexical unit list that includes a plurality of lexical units; (2) a classification component, which is configured to classify the plurality of lexical units into a first-type lexical unit that includes ambiguous tokens and a second-type lexical unit that does not includes ambiguous tokens; (3) a conversion component, which is configured to convert the first-type lexical unit into the second-type lexical unit; (4) a second parsing component, which is configured to parse the second-type lexical unit converted from the first-type lexical unit and the second-type lexical unit classified from the plurality of lexical units.

According to yet another aspect of the embodiments of the disclosure, a non-transitory computer-readable storage medium is also provided. The non-transitory computer-readable storage medium may include a stored program. When the program runs, a device where the non-transitory computer-readable storage medium is located is controlled to execute the method for parsing the programming language above.

According to yet another aspect of the embodiments of the disclosure, a processor is also provided. The processor is configured to run a program stored in a memory. When running, the program executes the method for parsing the programming language above.

BRIEF DESCRIPTION OF THE DRAWINGS

The drawings described herein for further understanding of the present disclosure consists a part of the disclosure. The schematic embodiments and description thereof are used for explaining the disclosure and do not limit the disclosure improperly. In the drawings.

DETAILED DESCRIPTION OF THE EMBODIMENTS

In order to enable those skilled in the art to better understand the solutions of the disclosure, the technical solutions in the embodiments of the disclosure will be clearly and completely described below in combination with the drawings in the embodiments of the disclosure, Obviously, the described embodiments are only a part of the embodiments of the disclosure, not all of them. Based on the embodiments of the disclosure, all other embodiments obtained by those of ordinary skill in the art without creative work shall fall within the scope of protection of the disclosure.

It is to be noted that terms "first", "second", etc., in the specification, claims, and drawings of the disclosure are adopted not to describe a specific sequence or order but to distinguish similar objects. It is to be understood that data used like this may be interchanged as appropriate such that the embodiments of the disclosure described here may be implemented, for example, according to sequences in addition to those illustrated or described here. In addition, terms "comprise," "comprising," "include," "including," "has," "having" or any other variations thereof, are intended to cover a non-exclusive inclusion. For example, a process, method, system, product or device that includes a list of steps or units is not necessarily limited to only those steps or units but may include other steps or units not expressly listed or inherent to such process, method, product or device.

The embodiments of the disclosure disclose a method and device for parsing a programming language, and a non-transitory computer-readable storage medium, so as to at least solve the technical problem that the introduction of mathematical token into the numerical computing programming language is ambiguity, which can lead to errors when the interpreter processes the numerical computing programming language.

According to the embodiments of the disclosure, an embodiment of the method for parsing the programming language is provided. It should be noted that the steps presented in the flowchart of the drawings can be executed in a computer system like a group of computer executable instructions, and moreover, although a logical order is shown in the flow chart, in some cases, the presented or described steps can be performed in an order different from that described here.

Figure 1:
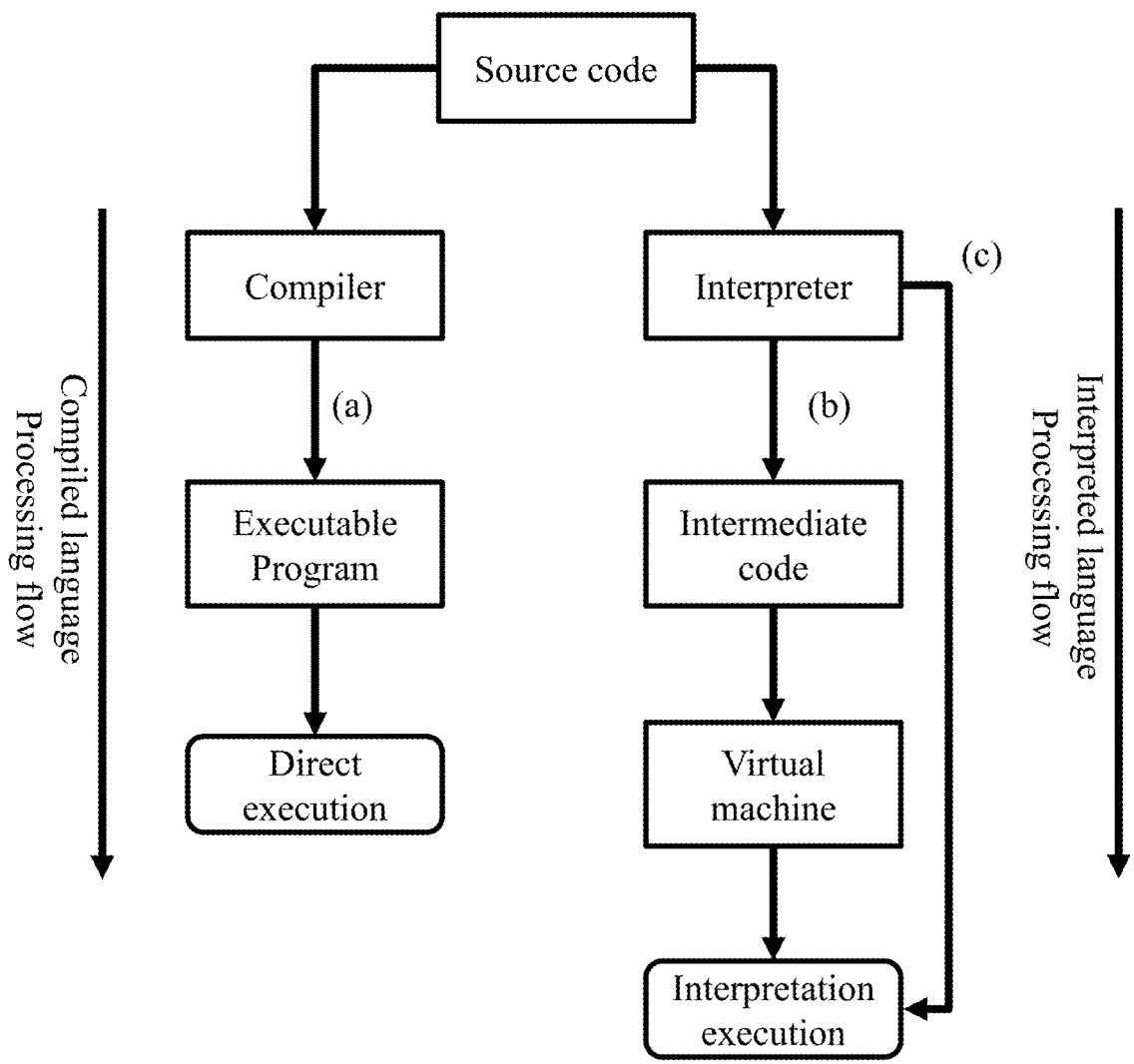
FIG. 1 is the schematic diagram of the compilation running process of the current high-level programming language.
Figure 2:
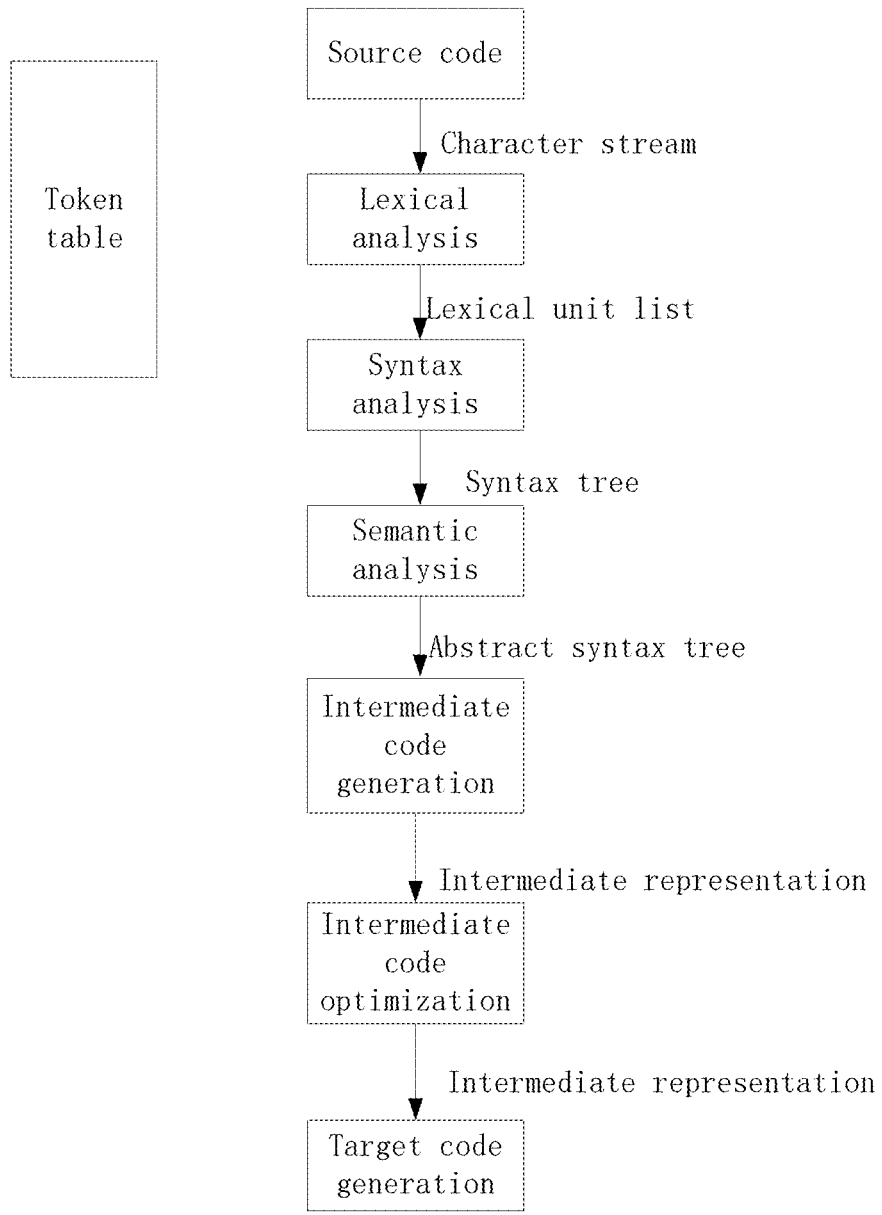
FIG. 2 is the flowchart of the running process of the compiler.
Figure 3:
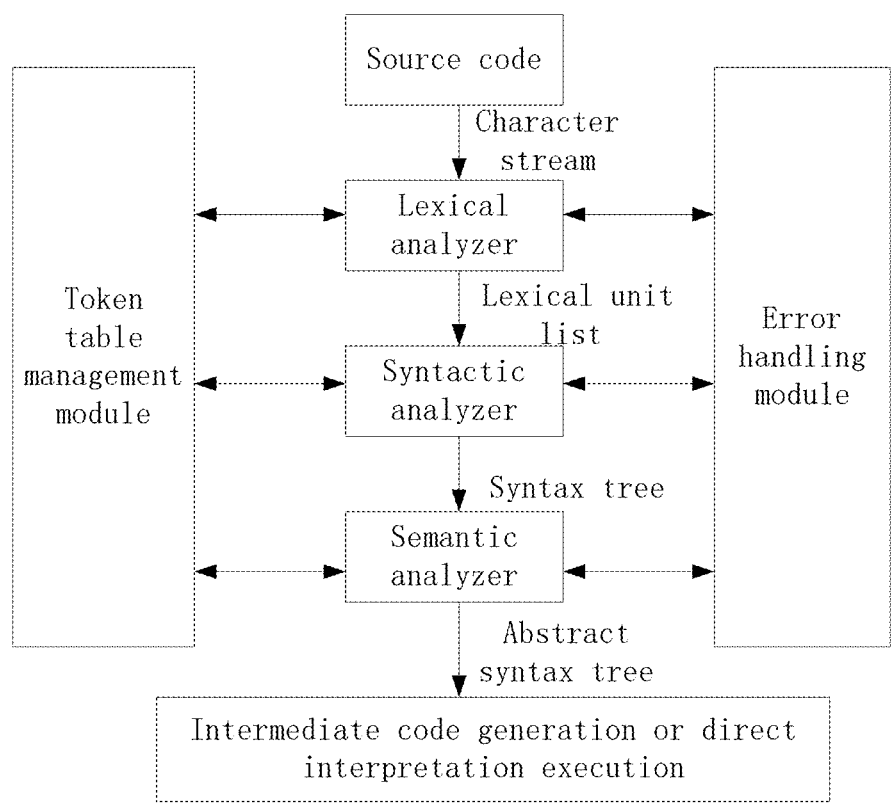
FIG. 3 is the flowchart of the running process of the interpreter.
Figure 4:
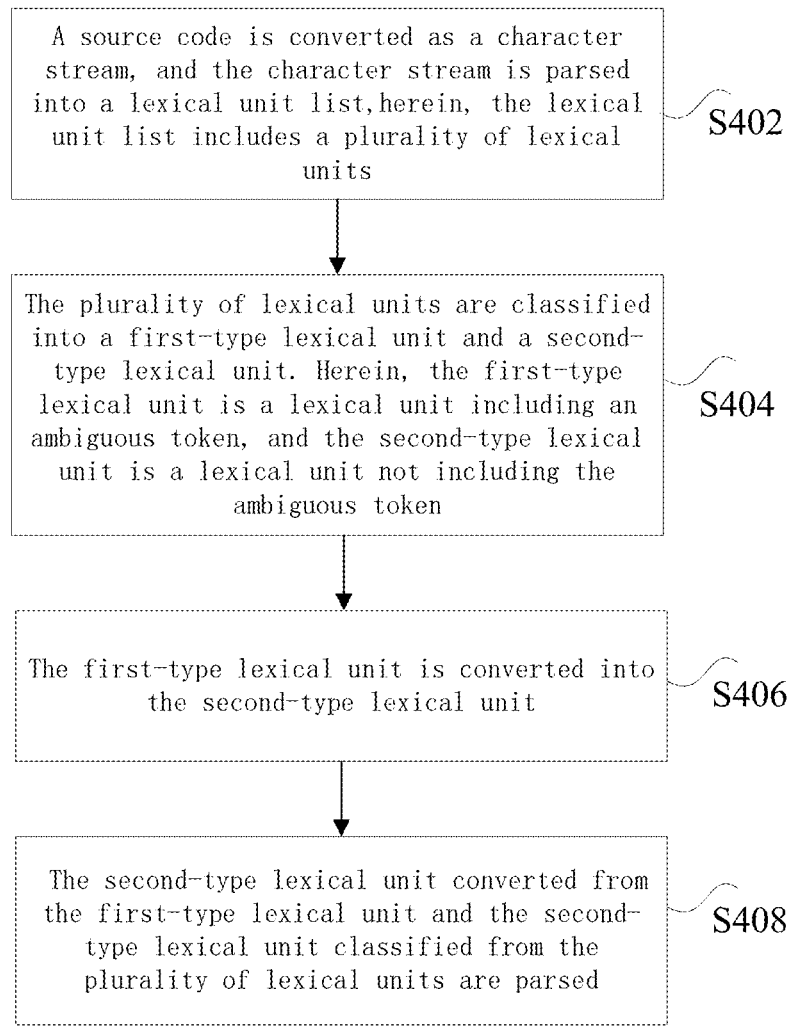
FIG. 4 is a flowchart of a method for parsing programming language according to the embodiment of the disclosure.

FIG. 4 is a flowchart of a method for parsing a programming language according to an embodiment of the disclosure. As shown in FIG. 4, the method includes the following steps.

At S402, a source code is converted as a character stream, and the character stream is parsed into a lexical unit list, herein, the lexical unit list includes a plurality of lexical units.

In the step, the source code is identified, and the source code is identified as the character stream. A lexical analyzer receives the character stream and parses a source program into the lexical unit list according to a set word formation rule, and the lexical unit list includes the plurality of lexical units.

At S404, the plurality of lexical units are classified into a first-type lexical unit and a second-type lexical unit, herein, the first-type lexical unit is a lexical unit including an ambiguous token, and the second-type lexical unit is a lexical unit not including the ambiguous token.

When S404 is executed, the lexical unit list is classified into the lexical unit including the ambiguous token and the lexical unit not including the ambiguous token.

At S406, the first-type lexical unit is converted into the second-type lexical unit.

At S408, the second-type lexical unit converted from the first-type lexical unit and the second-type lexical unit classified from the plurality of lexical units is parsed.

Through the above steps, by classifying the result of lexical analysis, namely, the lexical unit list, the ambiguous lexical unit is converted into the lexical unit without ambiguity, which achieves the purpose of improving the interpreter's ability to cope with the ambiguous code, thus achieving the technical effect of improving the interpreter's accuracy in coping with the numerical computing programming language.

According to an optional embodiment of the disclosure, S404 that the plurality of lexical units are classified into the first-type lexical unit and the second-type lexical unit is implemented by the following methods: token-names of the plurality of lexical units are acquired; an ambiguous target token-name is determined from the token-names; and the lexical unit to which the target token-name belongs is determined as the first-type lexical unit, and the lexical unit to which the token-names except the target token-name belong is determined as the second-type lexical unit.

In the step, the ambiguous token is found through the token-names of the lexical units, and these lexical units are marked as the first-type lexical unit, and other lexical units are marked as the second-type lexical unit.

According to another optional embodiment of the disclosure, S406 is executed to convert the first-type lexical unit into the second-type lexical unit, which includes that: the first-type lexical unit is input to a semantic analyzer for parsing to obtain the second-type lexical unit.

Alternatively, the operation of inputting the first-type lexical unit into the semantic analyzer for parsing to obtain the second-type lexical unit includes that: the type of the token-name of the first-type lexical unit is determined according to context information of the first-type lexical unit; and an attribute-value of the first-type lexical unit is modified according to the type of the token-name of the first-type lexical unit to obtain the second-type lexical unit.

In the step, the semantic analyzer receives the first-type lexical unit, discriminates a specific type of a word token of the first-type lexical unit according to the context, modifies the attribute-value of the first-type lexical unit according to a discrimination result, and changes the type of the first-type lexical unit into the second-type lexical unit.

In some optional embodiments of the disclosure, S408 is executed to parse the second-type lexical unit converted from the first-type lexical unit and the second-type lexical unit classified from the plurality of lexical units, which includes that: the second-type lexical unit converted from the first-type lexical unit and the second-type lexical unit classified from the plurality of lexical units are input to a syntactic analyzer for parsing; and a parsing result of the second-type lexical unit by the syntactic analyzer is input to the semantic analyzer for parsing.

In some optional embodiments of the disclosure, the operation of inputting the second-type lexical unit converted from the first-type lexical unit and the second-type lexical unit classified from the plurality of lexical units into the syntactic analyzer for parsing includes that: the second-type lexical unit converted from the first-type lexical unit and the second-type lexical unit classified from the plurality of lexical units are assembled into a syntax analysis tree.

The syntactic analyzer receives the second-type lexical unit and assembles a lexical unit sequence into the syntax analysis tree according to a set grammatical rule. An adaptive LL (k) algorithm is employed. The first L in the LL means analyzing the lexical unit sequence from left to right, the second L means using the leftmost derivation in the analysis process, and k≥1, where k means matching k lexical units forward in the matching process according to the grammatical rule. The adaptive LL (k) algorithm can dynamically analyze the syntax in the syntax analysis process, and can automatically rewrite left recursion in the grammar into an equivalent non-left recursion form.

According to an optional embodiment of the disclosure, the operation of inputting the parsing result of the second-type lexical unit by the syntactic analyzer into the semantic analyzer for parsing includes that: simplifying processing is performed on the syntax analysis tree to construct an abstract syntax tree.

The semantic analyzer receives the syntax analysis tree, the lexical unit sequence and token table information, simplifies the syntax tree and constructs the abstract syntax tree. The syntactic analyzer outputs error information to an error handling component, and updates an identifier in a token table management component according to a syntax analysis result. The semantic analyzer outputs the error information to the error handling component, and updates the identifier in the token table management component according to a semantic analysis result.

Figure 5A:
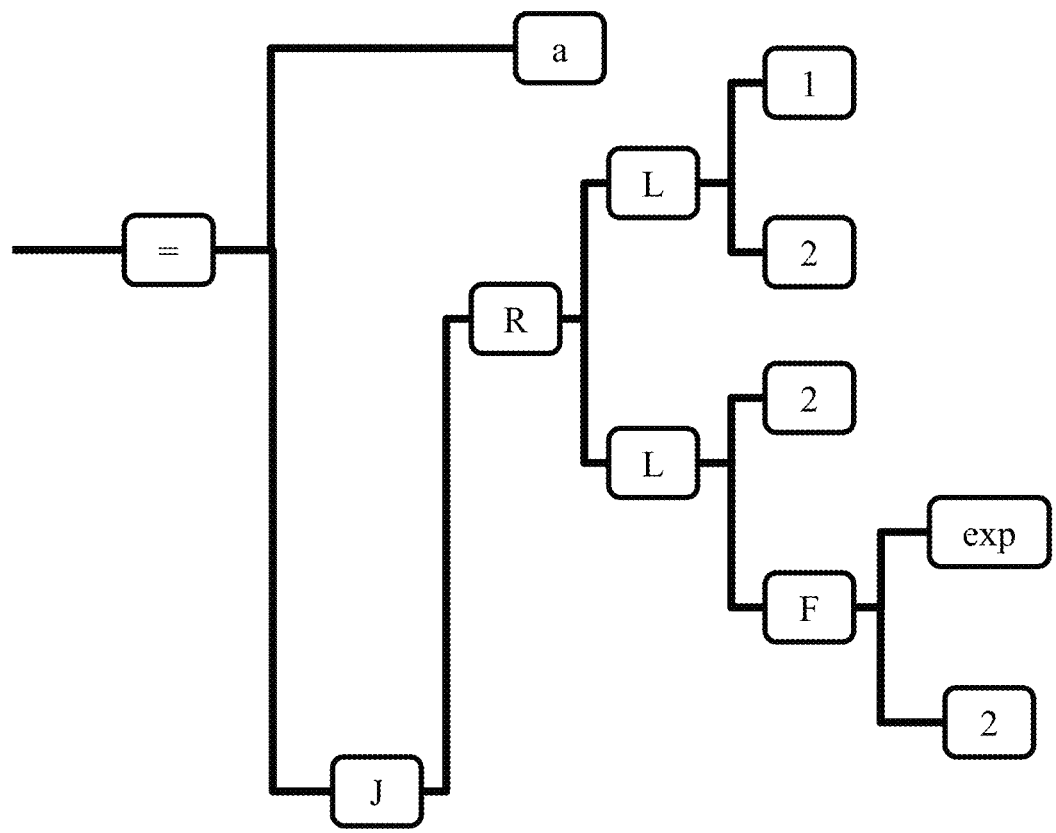
FIG. 5a is a schematic diagram of an abstract syntax tree according to the embodiment of the disclosure.

FIG. 5a is a schematic diagram of an abstract syntax tree according to an embodiment of the disclosure. As shown in FIG. 5a, a syntax tree corresponding to the source code defining a simple matrix is given, where L represents a list, R represents a row, J represents a matrix, and F represents a built-in function, all of which are placed in a user-defined token table.

The source code corresponding to the syntax tree shown in FIG. 5a is a=[1, 2; 2, exp (2)].

Figure 5B:
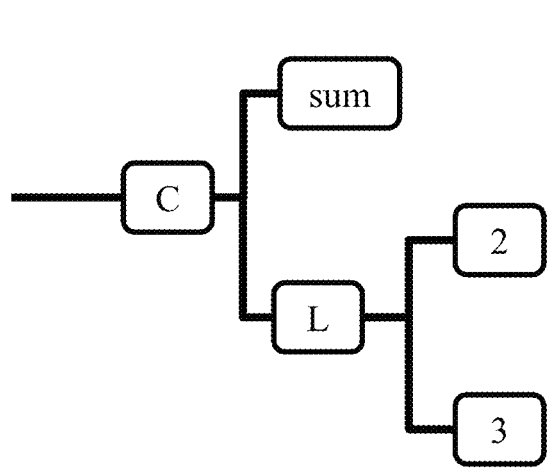
FIG. 5b is a schematic diagram of another abstract syntax tree according to the embodiment of the disclosure.

FIG. 5b is a schematic diagram of another abstract syntax tree according to an embodiment of the disclosure. As shown in FIG. 5b, a syntax tree corresponding to the source code of a user-defined function sum is given, where C represents the user-defined function.

The source code corresponding to the syntax tree shown in FIG. 5b is sum (2, 3).

According to another optional embodiment of the disclosure, when S402 is executed, the operation of parsing the character stream into the lexical unit list is implemented by the following method: the character stream is parsed into the lexical unit list according to a preset word formation rule. Herein, each lexical unit in the lexical unit list includes: the token-name and the attribute-value. The token-name is the lexical unit itself, and the attribute-value is the type of the lexical unit.

The syntactic analyzer receives the character stream and parses a source program into the lexical unit list according to the set word formation rule. The lexical unit is composed of the token-name and the attribute-value. The token-name is the word itself and is used by the syntactic analyzer. The attribute-value represents the type of the word, including a keyword, a constant, an operator, a delimiter and the identifier. The error information is output to the error handling component, and the identifier is input to a token management component.

The method provided by the embodiment of the disclosure may solve the problem of the ambiguous token in the numerical computing programming language and also solve the problem of the ambiguous token in another programming language. The compiler based on the technical solution may be applied to the numerical computing programming language, such as Maltab and Octave.

In the embodiments of the disclosure, such a manner is employed that the source code is converted as the character stream, and the character stream is parsed into the lexical unit list, the lexical unit list including a plurality of lexical units; the plurality of lexical units are classified into the first-type lexical unit and the second-type lexical unit, the first-type lexical unit being the lexical unit including the ambiguous token, and the second-type lexical unit being the lexical unit not including the ambiguous token; the first-type lexical unit is converted into the second-type lexical unit; and the second-type lexical unit converted from the first-type lexical unit and the second-type lexical unit classified from the plurality of lexical units are parsed. By classifying the result of lexical analysis, namely, the lexical unit list, the ambiguous lexical unit is converted into the lexical unit without ambiguity, which achieves the purpose of improving the interpreter's ability to cope with the ambiguous code, thus achieving the technical effect of improving the interpreter's accuracy in coping with the numerical computing programming language, and further solving the technical problem the introduction of mathematical token into the numerical computing programming language is ambiguity, which can lead to errors when the interpreter processes the numerical computing programming language.

Figure 6:
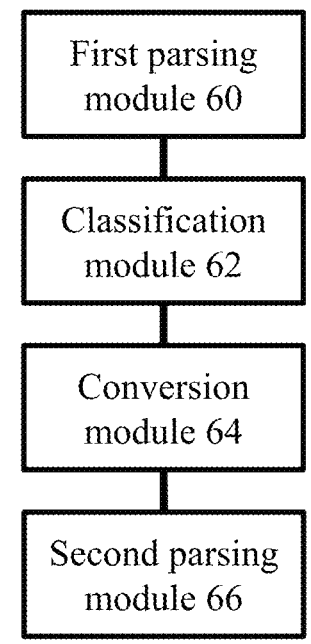
FIG. 6 is a structural block diagram of a device for parsing programming language according to the embodiment of the disclosure.

FIG. 6 is a structural block diagram of a device for parsing a programming language according to an embodiment of the disclosure. As shown in FIG. 6, the device includes: a first parsing component 60, a classification component 62, a conversion component 64 and a second parsing component 66.

The first parsing component 60 is configured to convert a source code as a character stream, and parse the character stream into a lexical unit list. The lexical unit list includes a plurality of lexical units.

The classification component 62 is configured to classify the plurality of lexical units into a first-type lexical unit and a second-type lexical unit. The first-type lexical unit is a lexical unit including an ambiguous token, and the second-type lexical unit is a lexical unit not including the ambiguous token.

The conversion component 64 is configured to convert the first-type lexical unit into the second-type lexical unit.

The second parsing component 66 is configured to parse the second-type lexical unit converted from the first-type lexical unit and the second-type lexical unit classified from the plurality of lexical units.

It is to be noted that the preferred implementation of the embodiment shown in FIG. 6 may refer to the related description of the embodiment shown in FIG. 4, and will not be repeated here.

The embodiment of the disclosure further provides a non-transitory computer-readable storage medium. The non-transitory computer-readable storage medium includes a stored program. When the program runs, a device where the non-transitory computer-readable storage medium is located is controlled to execute the method for parsing the programming language above.

The non-transitory computer-readable storage medium is configured to store the program that executes the following functions: a source code is identified as a character stream, and the character stream is parsed into a lexical unit list, the lexical unit list including a plurality of lexical units; the plurality of lexical units are classified into a first-type lexical unit and a second-type lexical unit, the first-type lexical unit being a lexical unit including an ambiguous token, and the second-type lexical unit being a lexical unit not including the ambiguous token; the first-type lexical unit is converted into the second-type lexical unit; and the second-type lexical unit converted from the first-type lexical unit and the second-type lexical unit classified from the plurality of lexical units are parsed.

The embodiment of the disclosure further provides a processor. The processor is configured to run a program stored in a memory. When running, the program executes the method for parsing the programming language above.

The processor is configured to run the program that executes the following functions: a source code is identified as a character stream, and the character stream is parsed into a lexical unit list, the lexical unit list including a plurality of lexical units; the plurality of lexical units are classified into a first-type lexical unit and a second-type lexical unit, the first-type lexical unit being a lexical unit including an ambiguous token, and the second-type lexical unit being a lexical unit not including the ambiguous token; the first-type lexical unit is converted into the second-type lexical unit; and the second-type lexical unit converted from the first-type lexical unit and the second-type lexical unit classified from the plurality of lexical units are parsed.

The serial numbers of the embodiments of the disclosure are merely for description and do not represent a preference of the embodiments.

In the above-mentioned embodiments of the disclosure, the descriptions of each embodiment have their own emphasis, and the parts that are not detailed in one embodiment may be referred to the related descriptions of other embodiments.

In the several embodiments provided in the disclosure, it is to be understood that the disclosed technical content may be implemented in other manners. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the units or the components, and may be electrical or adopt other forms.

The units described as separate parts may or may not be physically separate, and parts displayed as units may or may not be physical units, may be located in one position, or may be distributed on a plurality of units. Part or all of the units may be selected to achieve the purposes of the solutions of the embodiments according to a practical requirement.

In addition, each function unit in each embodiment of the disclosure may be integrated into a processing unit, or each unit may exist independently, or two or more than two units may also be integrated into a unit. The integrated unit may be implemented in a hardware form and may also be implemented in form of software functional unit.

When being implemented in form of software functional unit and sold or used as an independent product, the integrated unit may be stored in a computer-readable storage medium. Based on such an understanding, the technical solutions of the present disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the present disclosure. The above-mentioned storage medium includes: various media capable of storing program codes such as a U disk, a Read-Only Memory (ROM), a Random Access Memory (RAM), a mobile hard disk, a magnetic disk, or an optical disk.

The above is the optional implementation mode of the disclosure. It is to be pointed out that those of ordinary skill in the art may further make a plurality of improvements and embellishments without departing from the principle of the disclosure, and these improvements and embellishments shall also fall within the scope of protection of the disclosure.

INDUSTRIAL APPLICABILITY

The solution provided by the embodiments of the disclosure may be applied to the field of software. In the embodiments of the disclosure, it is employed that a source code is converted as a character stream, and the character stream is parsed into a lexical unit list, the lexical unit list including a plurality of lexical units; the plurality of lexical units are classified into a first-type lexical unit and a second-type lexical unit, the first-type lexical unit being a lexical unit including an ambiguous token, and the second-type lexical unit being a lexical unit not including the ambiguous token; the first-type lexical unit is converted into the second-type lexical unit; and the second-type lexical unit converted from the first-type lexical unit and the second-type lexical unit classified from the plurality of lexical units are parsed, which achieves the purpose of improving an interpreter's ability to cope with an ambiguous code, thus achieving the technical effect of improving the interpreter's accuracy in coping with a numerical computing programming language.

The invention claimed is:

1. A method for parsing a programming language, comprising:
   converting a source code into a character stream, and parsing the character stream into a lexical unit list, wherein the lexical unit list comprises a plurality of lexical units;
   classifying the plurality of lexical units into a first-type lexical unit and a second-type lexical unit, wherein the first-type lexical unit is a lexical unit comprising an ambiguous token, the second-type lexical unit being a lexical unit not comprising the ambiguous token;
   converting the first-type lexical unit into the second-type lexical unit; and
   parsing the second-type lexical unit converted from the first-type lexical unit and the second-type lexical unit classified from the plurality of lexical units,
   wherein parsing the character stream into the lexical unit list comprises:
   parsing the character stream into the lexical unit list according to a preset word formation rule, wherein each lexical unit in the lexical unit list comprises: a token-name and an attribute-value, the token-name being the symbol of the lexical unit itself, and the attribute-value being the type of the lexical unit.

2. The method as claimed in claim 1, wherein classifying the plurality of lexical units into the first-type lexical unit and the second-type lexical unit comprises:
   acquiring token-names of the plurality of lexical units;
   determining an ambiguous target token-name from the token-names; and
   determining the lexical unit to which the target token-name belongs as the first-type lexical unit, and determining the lexical unit to which the token-names except the target token-name belong as the second-type lexical unit.

3. The method as claimed in claim 1, wherein
   converting the first-type lexical unit into the second-type lexical unit comprises: inputting the first-type lexical unit into a semantic analyzer for parsing to obtain the second-type lexical unit;
   wherein parsing the second-type lexical unit converted from the first-type lexical unit and the second-type lexical unit classified from the plurality of lexical units comprises: inputting the second-type lexical unit converted from the first-type lexical unit and the second-type lexical unit classified from the plurality of lexical units into a syntactic analyzer for parsing; and inputting a parsing result of the second-type lexical unit by the syntactic analyzer to the semantic analyzer for parsing.

4. The method as claimed in claim 3, wherein inputting the first-type lexical unit into the semantic analyzer for parsing to obtain the second-type lexical unit comprises:
   determining a type of the token-name of the first-type lexical unit according to context information of the first-type lexical unit; and
   modifying an attribute-value of the first-type lexical unit according to the type of the token-name of the first-type lexical unit to obtain the second-type lexical unit.

5. The method as claimed in claim 3, wherein inputting the second-type lexical unit converted from the first-type lexical unit and the second-type lexical unit classified from the plurality of lexical units into the syntactic analyzer for parsing comprises:
   assembling the second-type lexical unit converted from the first-type lexical unit and the second-type lexical unit classified from the plurality of lexical units into a syntax analysis tree.

6. The method as claimed in claim 5, wherein inputting the parsing result of the second-type lexical unit by the syntactic analyzer to the semantic analyzer for parsing comprises:
   performing simplifying processing on the syntax analysis tree to construct an abstract syntax tree.

7. A non-transitory computer-readable storage medium, the non-transitory computer-readable storage medium comprising a stored program, wherein when the program runs, a device where the non-transitory computer-readable storage medium is located is controlled to execute the method for parsing the programming language as claimed in claim 1.

8. A processor, the processor being configured to run a program stored in a memory, wherein when running, the program executes the method for parsing the programming language as claimed in claim 1.

* * * * *